Figure 1:
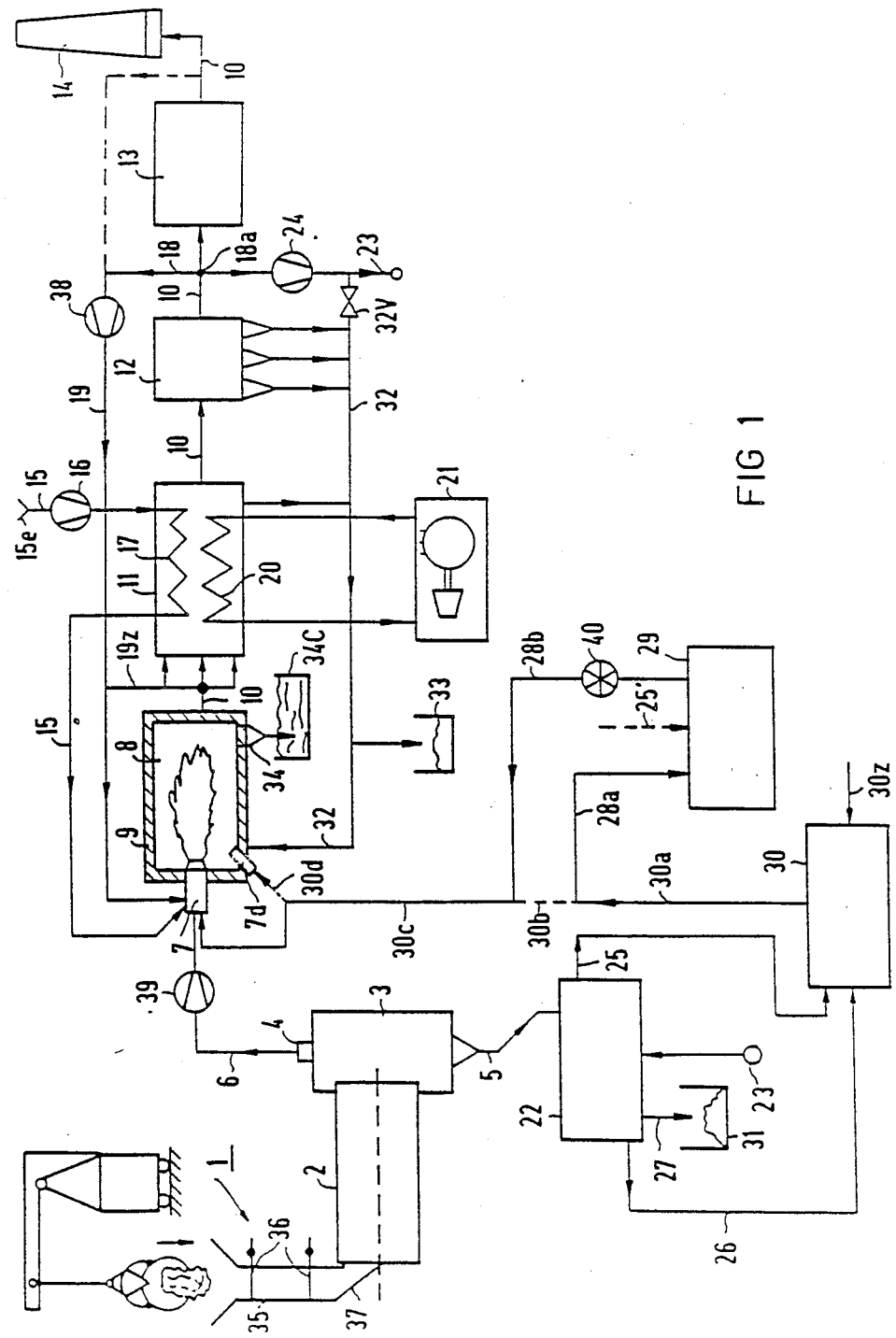

United States Patent [19]

Tratz et al.

[11] Patent Number: 4,878,440

[45] Date of Patent: Nov. 7, 1989

[54] METHOD AND PLANT FOR THERMAL WASTE DISPOSAL

[75] Inventors: Herbert Tratz, Ottensoos; Klaus Riedle; Georg Loesel, both of Uttenreuth, all of Fed. Rep. of Germany

[73] Assignee: Siemens Aktiengessellschaft, Munich, Fed. Rep. of Germany

[21] Appl. No.: 200,646

[22] Filed: May 31, 1988

[30] Foreign Application Priority Data

Aug. 3, 1987 [DE] Fed. Rep. of Germany ....... 3725704
Apr. 8, 1988 [DE] Fed. Rep. of Germany ....... 3811820

[51] Int. Cl.$^4$ .............................................. F23B 7/00
[52] U.S. Cl. .................................... 110/233; 110/229; 110/234; 110/259; 110/346
[58] Field of Search ............... 110/235, 229, 226, 346, 110/233, 234, 259

[56] References Cited

U.S. PATENT DOCUMENTS

| | | | |
|---|---|---|---|
| 3,818,869 | 6/1974 | Blaskowski | 110/229 X |
| 4,417,528 | 11/1983 | Vining et al. | 110/229 |
| 4,676,177 | 6/1987 | Engstrom | 110/229 X |
| 4,774,895 | 10/1988 | Christmann | 110/229 X |

Primary Examiner—Edward G. Favors

Attorney, Agent, or Firm—Herbert L. Lerner; Laurence A. Greenberg

[57] ABSTRACT

A plant for thermal waste disposal includes a pyrolysis reactor converting waste into carbonization gas and substantially non-volatile pyrolysis residue and a discharge device connected to the pyrolysis reactor. A combustion chamber operated with an oxygen excess is connected to a carbonization gas discharge fitting of the discharge device for receiving the carbonization gas. A residue sorting device is connected to the pyrolysis residue outlet of the discharge device for sorting out coarser coarse components substantially including non-combustible ingredients such as rocks, glass shards, broken porcelain, and metal parts, from combustible finer coarse components. A transport device connected to the residue sorting device transports the finer coarse components. A grinding apparatus has an inlet side connected to the transport device and a discharge side for feeding the finer coarse components to the combustion chamber after grinding. The combustion chamber maintains combustion gases produced from delivered combustible material for a sufficiently long time at a sufficient temperature level to produce molten slag. The combustion chamber has an outlet for removing the molten slag which is cooled into a glassified form downstream of the outlet of the combustion chamber. A flue gas line leads from the combustion chamber to a chimney.

29 Claims, 2 Drawing Sheets

METHOD AND PLANT FOR THERMAL WASTE DISPOSAL

SPECIFICATION

The invention relates to a method and a plant for thermal waste disposal. The plant is equipped with a pyrolysis reactor, which converts the waste into low-temperature carbonization gas and solid pyrolysis residue. A discharge device connected to the pyrolysis reactor sorts out the low-temperature carbonization gas and fine dust from the coarser pyrolysis residue. A combustion chamber receives the low-temperature carbonization gas and fine dust.

A plant of this kind for thermal waste disposal is known from German Patent DE-PS 24 32 504, among other sources. In this plant, the waste (for instance, household garbage) is carbonized under conditions of air exclusion at a temperature of between 300° and 600° C., and the low-temperature carbonization gas obtained in the process is carried continuously through a red-hot coke bed, which is formed from the low-temperature carbonization coke that is produced and from preheated fresh air delivered to it. In the coke bed, the low-temperature carbonization gas is converted into high-energy combustion gas. In this process, only enough oxygen to maintain the temperature in the coke bed is added. Not only the low-temperature carbonization coke produced in the low-temperature carbonization process but a high-grade carbon carrier, such as brown coal low-temperature carbonization coke or charcoal, is also delivered to the coke bed. The combustion gas obtained contains virtually no toxic or dangerous substances, because of the splitting of the longer molecule chains that take place as it passes through the red-hot coke bed. The combustion gas can be cooled in a heat exchanger and then cleaned in a gas scrubbing system and it can then be used for heating purposes or to operate internal combustion engines. It is a characteristic of such a system for thermal waste disposal that it usually is not located in the immediate vicinity of a customer for the combustion gas. Accordingly, in addition to the plant costs, costs also arise for furnishing an extensive gas pipeline network to the individual consumers. A more important factor, however, is that the solid pyrolysis residue is stored at a waste disposal site. Here there is the danger that toxic or dangerous substances contained in the residue, such as heavy metal compounds, will wash out or leach out in the course of time and travel into the ground water or into streams and rivers. Additionally, the thermal energy contained in the residue goes unused.

In order to overcome the last-mentioned disadvantage in particular, British Pat. No. 1,562,492 provides for the pyrolysis residue, after pulverization, to be sorted but with a sieve into a coarser coarse component (inorganic substances such as metals, ceramic and glass) and a finer coarse component (having a high proportion of components containing carbon). The metals are precipitated out of the coarser coarse component. The finer coarse component is combusted together with coal in a further comminuted form in a combustion chamber and thermally utilized in this way. The combustion chamber is also supplied with the low-temperature carbonization gas produced in the pyrolysis, from which oils and tars having a high boiling point are first removed in a condenser. It should be noted here that the combustion chamber in the known plant is the furnace chamber of a conventional coal combustion system, and that the combustion chamber is part of a steam generator. Due to the cooling of the combustion chamber walls which is typical in such a system, there is the danger that toxic or dangerous substances from both the combustion of the pyrolysis gas and the combustion of the pyrolysis residue can at least to some extent leave the combustion plant being used and can be given off into the environment (air, hazardous-waste dumps, soil, water). This is particularly true for organic toxic substances, but also possible for heavy metal oxides such as cadmium oxide, zinc oxide, mercury oxide and thallium oxide. There is no mention of making any use of the combustion chamber residues.

It must be the goal of every waste disposal system to keep the environmental burden of toxic or dangerous substances, of whatever kind, as low as possible.

It is accordingly an object of the invention to provide a method and plant for thermal waste disposal, which overcomes the hereinafore-mentioned disadvantages of the heretofore-known methods and devices of this general type, which largely eliminates organic and inorganic toxic or dangerous substances and which produces few residues that are of little further use and must be stored in a dump. The investment cost should also be as low as possible, and the total efficiency of the plant should be as high as possible. Furthermore, an economical method for waste disposal is to be disclosed.

With the foregoing and other objects in view there is provided, in accordance with the invention, a plant for thermal waste disposal, comprising a pyrolysis reactor converting waste into carbonization gas and substantially non-volatile pyrolysis residue, a discharge device connected to the pyrolysis reactor having a non-volatile pyrolysis residue outlet and a carbonization gas discharge fitting for removal of carbonization gas, a combustion chamber operated with an oxygen excess being connected to the carbonization gas discharge fitting for receiving the carbonization gas, a residue sorting device connected to the pyrolysis residue outlet of the discharge device for sorting out coarser coarse components substantially including non-combustible ingredients such as rocks, glass shards, broken porcelain, and metal parts, from combustible finer coarse components, a transport device connected to the residue sorting device for transporting the finer coarse components, a grinding apparatus having an inlet side connected to the transport device and a discharge side for feeding the finer coarse components to the combustion chamber after grinding, the combustion chamber having means for maintaining combustion gases produced from delivered combustible material for a sufficiently long time at a sufficient temperature level to produce molten slag, the combustion chamber having an outlet for removing the molten slag, means downstream of the outlet of the combustion chamber for cooling the molten slag into a glassified form, a flue gas line leading from the combustion chamber, and a chimney connected to the flue gas line. A waste heat steam generator system, a dust filtration system and a flue gas scrubbing system may be disposed in the flue gas line.

The residue sorting device connected to the discharge device of the pyrolysis reactor effects a splitting up or in particular a sifting into a coarser coarse component, for example with a grain size larger than 5 mm, and a finer coarse component, for example having a grain size smaller than 5 mm. Some of the fine components (predominantly fine dust) occurring in the pyrolysis reactor are fed directly to the combustion chamber along with the low-temperature carbonization gas. Another portion of these fine components (fine dust) is added to the finer coarse components by the residue sorting device. Due to the splitting up (sifting), a sorting out of the non-combustible components (such as rocks, glass shards, pieces of broken porcelain, and metal parts) from the combustible components (low-temperature carbonization coke produced for instance from wood, plastic parts, fiber materials) is additionally performed. This sorting of the non-combustible substances from the substances to be combusted further following the low-temperature carbonization process in the pyrolysis reactor, is the precondition for the ability to further combust these latter substances without excessively great emission problems. At the same time, this permits the metals discharged from the pyrolysis reactor to remain usable in non-oxidized form, or in other words to be readily recycled. Finally, the grinding of the combustible finer coarse components of the pyrolysis residue and the combustion of these components (preferably together with the fine components of the pyrolysis residue) generates additional heat, which is converted in the plant itself into steam energy through a waste heat steam generator, and then into electrical energy. A separate a gas pipeline network is not needed for this form of utilization of the thermal energy produced.

In accordance with another feature of the invention, the residue sorting device includes means for first separating the fine components and for next separating the finer coarse components from the coarser coarse components by blowing away or wind sifted with an inert gas. The heavy coarse components remain where they are and in this way they can be precipitated out separately. This kind of sorting is reliable and yet does not entail overly great expense. The blowing is suitably accomplished with flue gas at an elevated pressure from the flue gas line. Sifting alone or combined with wind sifting, is also possible.

The combustion chamber that produces the molten slag is a melting chamber, which may be of conventional construction. It is supplied with the ground finer coarse components through a line or some other transport device.

In accordance with a further feature of the invention, the combustion chamber producing the molten slag is a high-temperature combustion chamber which includes means for withstanding wall temperatures above 1200° C. and for maintaining supplied gases at a temperature level above 1200° C. The combustion chamber can also be operated at this temperature. At this high temperature, all organic toxic substances decompose, and any ash introduced (ash contained in the pyrolysis residue) occurs for the most part in the molten state and can be removed. The high-temperature carbonization chamber is preferably supplied not only with the ground finer coarse components but also with the low-temperature carbonization gas. The low-temperature carbonization gas combustion chamber and the pyrolysis residue combustion chamber may instead be separate combustion chambers, however. Both of them may be constructed as melting chambers. The toxic or dangerous gases still contained in the flue gas can be sorted out in a flue gas scrubbing system of the kind available on the market.

In accordance with an added feature of the invention, there is provided a line connected between the residue sorting device and the grinding apparatus for the fine components, and an intermediate bin connected between the grinding apparatus and the combustion chamber for the temporary storage of at least one of the fine components and the ground finer coarse components.

In accordance with an additional feature of the invention, there is provided a metering device connected between the intermediate bin and the combustion chamber for feeding intermediately stored components of the residue.

In accordance with yet another feature of the invention, there is provided a waste heat steam generator system, a dust filtration system and a flue gas scrubbing system disposed in the flue gas line, the metering device regulating the heating output of the waste heat steam generator system.

In accordance with yet a further feature of the invention, there is provided a return line connected to the flue gas line and to the combustion chamber for returning fly ash precipitated out of flue gas to the combustion chamber.

In accordance with yet an added feature of the invention, the flue gas line includes a point downstream of the waste heat steam generator system at which a first portion of flue gases is removed, and a flue gas recirculation line returning the first portion to the combustion chamber for temperature regulation.

In accordance with yet an additional feature of the invention, there is provided an inlet line through which a second portion of the flue gases is removed downstream of the waste heat steam generator system and returned to the waste heat steam generator system for temperature regulation.

In accordance with still another feature of the invention, the inlet line carries the second portion of returned flue gases in a comparatively cold state and forms a comparatively cool gas mist along walls of the waste heat steam generator system when injected in the waste heat steam generator system.

In accordance with still a further feature of the invention, the combustion chamber is an uncooled combustion chamber.

In accordance with still an added feature of the invention, the waste heat steam generator system produces steam for long-distance heat production.

In accordance with still an additional feature of the invention, the waste heat steam generator system produces process steam.

In accordance with again another feature of the invention, there is provided an integrated steam power plant connected to the waste heat steam generator system for receiving steam for power generation.

In accordance with again a further feature of the invention, there is provided a feed device introducing the waste in uncomminuted form into the pyrolysis reactor.

In accordance with again an added feature of the invention, the means for cooling the molten slag are in the form of a water bath for granulation of the slag removed from the combustion chamber.

In accordance with again an additional another feature of the invention, the combustion chamber includes heat insulation.

In accordance with another feature of the invention, the heat insulation is in the form of an uncooled masonry lining.

In accordance with a further feature of the invention, there is provided a container, and a return line connected to the container through which fly ash precipitated out of flue gas and in particular enriched with metal oxides is removed into the container.

With the objects of the invention in view, there is also provided a plant for thermal waste disposal, comprising: a pyrolysis reactor converting waste into carbonization gas and pyrolysis residue at substantially 300° to 600° C.; a discharge device downstream of the pyrolysis reactor having a carbonization gas outlet and a pyrolysis residue outlet; a combustion chamber constructed for more than 1200° C. being connected to the carbonization gas outlet, means for heating the combustion chamber to a predetermined temperature level assuring thermal destruction of organic toxic or dangerous substances introduced therein with the supplied gases, the combustion chamber having an outlet for the removal of molten slag, and means for cooling the molten slag into a glassified form; and a residue sorting device connected to the pyrolysis residue outlet for sorting the pyrolysis residue of the discharge device into components of larger and smaller diameters, and a grinding device connected between the residue sorting device and the combustion chamber for delivering the components of the residue having smaller diameters to the combustion chamber.

With the objects of the invention in view, there is furthermore provided a method for thermal waste disposal, which comprises: carbonizing waste at a relatively low temperature while largely excluding oxygen, to form carbonization gas and a pyrolysis residue; sorting out the pyrolysis residue into a fine component, a finer coarse component and a coarser coarse component; combusting the fine component, comminuting and then combusting the finer coarse component, producing flue gas and molten slag, and precipitating out the coarser coarse component.

In accordance with another mode of the invention, there is provided a method which comprises combusting the finer coarse component together with the carbonization gas.

In accordance with further mode of the according to invention, there is provided a method which comprises precipitating dust out of the flue gas, and melting the dust into the slag.

In accordance with an added mode of the according to invention, there is provided a method which comprises using thermal energy of the flue gas for at least one of heating supplied oxygen and generating steam.

In accordance with an additional mode of the according to invention, there is provided a method which comprises admixing scrubbed flue gas with burning carbonization gas for temperature regulation.

In accordance with yet another mode of the according to invention, there is provided a method which comprises temporarily storing at least one of the fine component and the finer coarse component prior to combustion.

In accordance with yet a further mode of the according to invention, there is provided a method which comprises precipitating fly ash enriched with heavy metal oxides out of the flue gas and using the fly ash with heavy metal oxides as raw materials for recycling the heavy metal oxides.

In accordance with a concomitant mode of the according to invention, there is provided a method which comprises cooling the molten slag for later use for construction purposes.

The plant and method described are distinguished by the outstanding opportunities they provide for utilizing waste in terms of both materials and energy. With low residual emissions, the waste is prepared in an environmentally acceptable way. Halogenated hydrocarbons, such as dioxins and furans which are contained in the low-temperature carbonization gas, are rendered harmless. The solid pyrolysis residue has been shown by tests to be largely dioxin-free. However, it contains heavy metals such as cadmium and mercury, which can be safely stored in a conventional manner. Organic toxic or dangerous substances present in the pyrolysis residue are combusted and thus destroyed. The non-combustible components of the pyrolysis residue are in part precipitated out in coarse form and can possibly be recycled. In part, they are converted into molten slag. After cooling, the slag is in a glassified form. The substances contained in the glass, such as heavy metals, are securely contained so that they cannot leach out, for example. The production of only small quantities of exhaust gas and the good thermal exploitation of the waste produced are further advantages that can be mentioned.

The term "waste" is intended to mean primarily waste substances that are produced in industry and in homes, for instance household garbage, as well as slag from a conventional garbage combustion plant. This term does not encompass construction rubble, for example, although combustion rubble may naturally also be mixed in with the aforementioned substances. The term "pyrolysis" encompasses the thermal decomposition of organic substances, especially, at elevated temperatures, of for instance 300° to 900° C., in which large molecules are broken down into small, often gaseous molecules. The pyrolysis is frequently performed with an oxygen deficiency.

Other features which are considered as characteristic for the invention are set forth in the appended claims.

Although the invention is illustrated and described herein as embodied in a method and plant for thermal waste disposal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
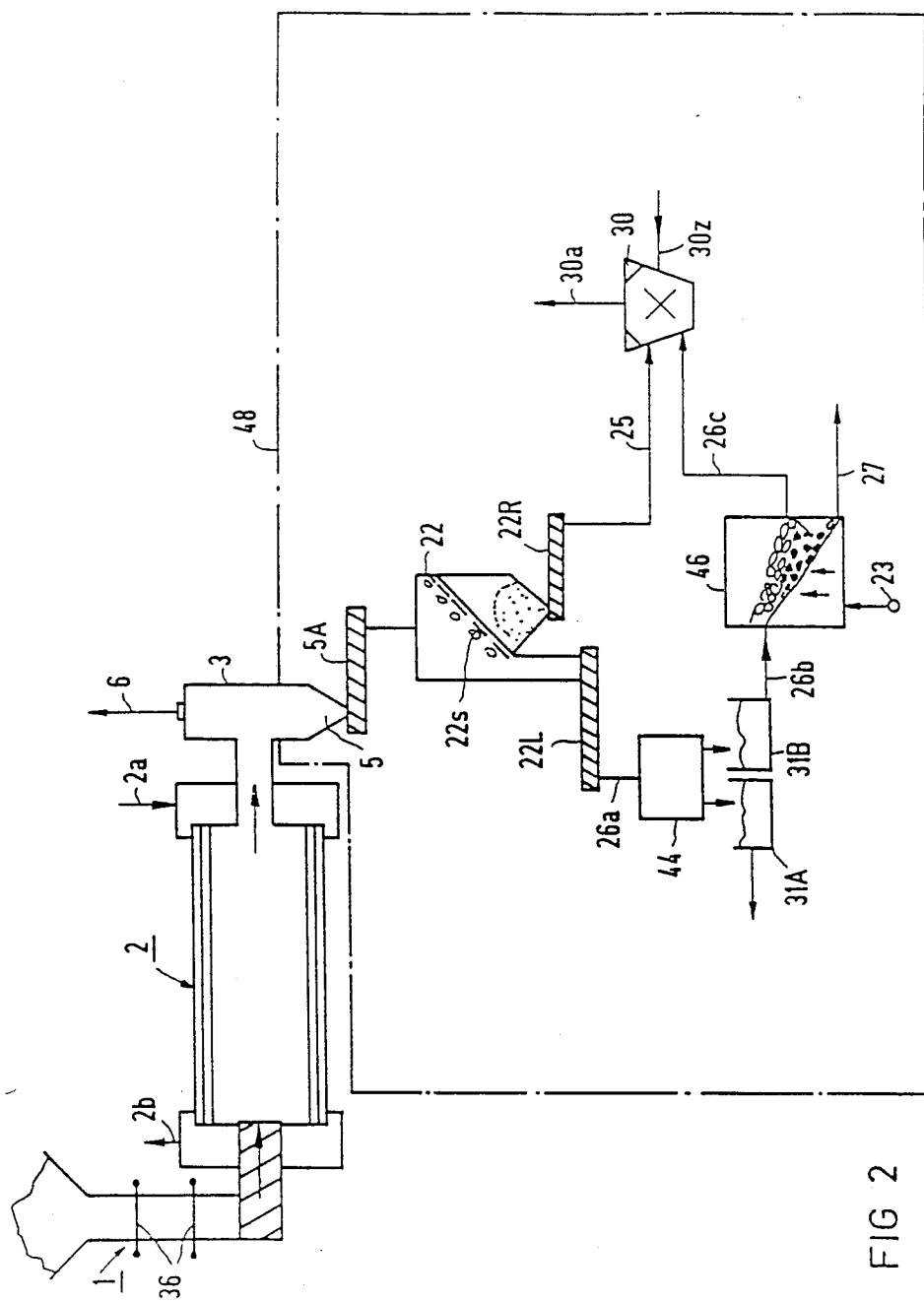

FIG. 1 is a diagrammatic and block circuit diagram of a plant for thermal waste disposal according to the invention; and FIG. 2 is a circuit diagram of another plant, with more technical details.

Referring now to the figures of the drawings in detail and first, particularly, to FIG. 1 thereof, there is seen the structure and interplay of the individual components of a plant for thermal waste disposal, in which reference numeral 1 generally indicates a delivery or feed apparatus for delivering solid waste to a pyrolysis reactor 2. In the illustrated embodiment, the pyrolysis reactor 2 is a conventional pyrolysis drum that operates at 300° to 600° C., is operated largely with the exclusion of oxygen, and produces not only volatile low-temperature carbonization gas but a largely solid pyrolysis residue. The output or discharge side of the pyrolysis drum 2 is followed by a discharge device 3, which is provided with a low-temperature carbonization gas discharge fitting or outlet 4 for the removal of low-temperature carbonization gas, as well as with a pyrolysis residue transport device or transport line or outlet 5 for the removal of solid pyrolysis residue. A low-temperature carbonization gas line 6 connected to the low-temperature carbonization gas discharge fitting 4 of the discharge device 3, is connected to a burner 7 of a high-temperature combustion chamber 8.

The high-temperature combustion chamber 8 is constructed for a temperature above 1200° C. and is cooled over a given length. This assures that the dwell time of the gases introduced into the chamber 8 in the temperature range above 1200° C. (at the walls as well) is sufficiently long to effect a thermal destruction of the organic toxic or dangerous substances. The dwell time is approximately 1 to 5 seconds after the flame burns out. The length of the flame may be 7 meters, for example. The combustion chamber 8 is provided with a thermal insulation or thermal shield 9. A waste heat steam generating system 11, a dust filtering system 12, a flue gas scrubbing system 13 and a chimney 14 are connected in series with one another to the flue gas line 10 leaving the high-temperature combustion chamber 8, in the order given. The burner 7 of the high-temperature combustion chamber 8 is supplied with heated fresh air from a fresh-air line 15, which in turn is supplied with fresh air from an air inlet 15e and leads to an air compressor 16. This fresh-air line 15 leads from the air compressor 16 through a fresh-air and flue-gas heat exchanger 17 disposed in the waste heat steam generating system 11, and/or through a non-illustrated steam air preheater, to the burner 7.

As FIG. 1 shows, following the dust filtering system 12, a branch 18 leads from the flue gas line 10 at a connection point 18a to a flue gas recirculation line 19. Flue gas that has already been cooled and from which the dust has been removed, can be supplied to the burner 7 of the high-temperature combustion chamber 8 through the line 19 in order to control or regulate temperature. Alternatively, or additionally, the gas can also be blown into the flame of the combustion chamber. Furthermore, in order to lower the temperature, the flue gas from the flue gas recirculation line 19, which has already cooled and from which the dust has already been removed, can be admixed through an inlet line 19z and through non-illustrated nozzles, with the flue gas that is flowing to the waste heat steam generator system 11 from the high-temperature combustion chamber 8. This advantageous injection of the cooler flue gas along the walls of the waste heat steam generator system 11 is also shown in FIG. 1. Constant blowing-in of flue gas along the inner wall is preferred. Once again, temperature control or regulation is possible. It is also possible to supply flue gas from the recirculation line 19 to a separate non-illustrated heat exchanger for heating the fresh air. Heating surfaces 20 that communicate with a schematically illustrated steam power plant 21 and supply it with water vapor, are disposed in the waste heat steam generator system 11. The steam power plant 21 is intended for generating power. A long-distance heating line may be provided instead.

The pyrolysis residue transport line 5 of the discharge device 3 leads to a residue sorting device 22. In this residue sorting device 22, which may be constructed in the form of a sieve, the extracted pyrolysis residue is divided into a fine component (made of fine dust or powder), a finer coarse component and a coarser coarse component. The fine component substantially includes combustible fine dusts and powders. The finer coarse component substantially includes the combustible ingredients of the coarse component of the pyrolysis residue. The coarser coarse component substantially includes non-combustible components such a rocks, glass shards, broken porcelain and metal parts.

In order to supply "inert gas", the residue sorting device 22 is connected to an inert gas delivery line 23, in which a pressure-increasing compressor 24 is incorporated, as seen below the connecting point 18a in FIG. 1. The term "inert gas" is intended in this context to mean some gas that does not lead to ignition, such as nitrogen, a low-oxygen or oxygen-free gas mixture, or even a flue gas of this type. The inert gas delivery line 23 in the illustrated embodiment is in turn connected to the flue gas line 10 downstream of the dust filter system 12, at the connection point 18a. Three lines lead away from the residue sorting device 22, namely a fine component line 25 for the fine component (fine dust), a transport device or line 26 for the finer coarse component which may have a diameter of less than 5 mm, and a line 27 for the coarser coarse component which may have a diameter of more than 5 mm. Both the fine component line 25 and the line 26 for the fine fraction or finer coarse component lead through a mill or grinding device 30 and through a transport device, which in this case is in the form of three lines 30a, 30b and 30c leading to the burner 7 of the high-temperature combustion chamber 8. The broken line 30b may be interrupted, so that the line 30a is connected to a line branch 28a that leads into an intermediate (temporary storage) bin 29 for the fine components and for the ground finer coarse components. The bin 29 communicates through a line branch 28b with the line 30c. A metering device 40, which may be controlled conveyor means, is located in the line 28b in order to regulate the temperature or heating output of the combustion chamber 8. In this case the line 30c leads directly into the combined gas and dust burner 7. Instead, it may lead through a broken line 30d to a separate dust burner 7b.

Depending on the sifting quality in the residue sorting device 22, the fine dust can be carried through the line 25 directly into the intermediate bin 29, bypassing the grinding device 30. This is represented by a broken line arrow 25'.

The line 27 for the coarse components of high specific gravity leads into a container 31. Predominantly rocks, glass and ceramic but also metal parts are collected in the container 31. These substances can be recycled. The line 27 can also lead to a non-illustrated metal precipitating device, in which the metal parts are sorted out from the rocks and from the pieces of glass and ceramic. The latter items can either by ground up or taken to a dump. From the mill 30, the ground residue is sent either directly to the burner 7 or to the dust bin 29.

The fly ash (dust) occurring in the dust filter system 12 and possibly in the waste heat steam generator system 11 as well, can be blown into the high-temperature combustion chamber 8 through an ash return line 32. This blowing-in is provided by connecting the ash return line 32 through a valve 32V to the inert gas delivery line 23 or directly to the flue gas line 10 at the outlet of the dust filter system 12 in a non-illustrated manner. If needed, the fly ash can also be blown into a container 33. In this way, ash enriched with metal is removed from circulation. The return of fly ash into the combustion chamber 8 can also be accomplished with non-illustrated mechanical transport devices.

The high-temperature combustion chamber 8 is provided with a slag outlet 34. The molten slag is carried through the outlet to a water container 34C, where it solidifies into a glassy granulate.

One advantage of this plant for thermal waste disposal is that preliminary communication of the waste using shredders, which is otherwise necessary in pyrolysis plants but is very expensive in terms of energy and necessitates high investment, is possible but is not absolutely necessary. In the illustrated plant, the unshredded waste in the feed device 1 can be introduced into the pyrolysis drum 2 through a drop chute 35 having a double sluice 36 and a slide 37. Upon heating in the pyrolysis drum 2, the waste is partially gasified at 300° to 600° C. The resultant low-temperature carbonization gas and some of the resultant fine dust is carried through the discharge (or low-temperature carbonization gas removal) fitting 4 of the discharge device 3, and through the low-temperature carbonization gas line 6, into the burner 7 of the high-temperature combustion chamber 8. There, the low-temperature carbonization gas, which contains organic toxic substances, combusts along the heated fresh air supplied from the air compressor 16 through the fresh-air line 15 and the fresh-air and flue-gas heat exchanger 17, in other words under conditions of oxygen or air exclusion. The wall temperature in the high-temperature combustion chamber 8 is maintained above 1200° C. At this high temperature, all the longer molecule chains, in other words the organic toxic substances, decompose. In order to keep the gases at this wall temperature level of above 1200° C. for a sufficiently long period and in a stable manner, the high-temperature combustion chamber 8 in the illustrated embodiment has a relatively large volume and is uncooled over a certain length. The wall temperature is regulated to a predetermined set-point value above 1200° C. by means of a non-illustrated regulator, such as by providing a more or less pronounced blowing in of cooled flue gas, which is diverted downstream of the waste heat steam generator system 11, or even downstream of the dust filter system 12 in the illustrated embodiment, and delivered to the burner 7 through the flue gas recirculation line 19. In order to vary the throughput of blown-in air, a gas compressor 38 is built into the flue gas recirculation line 19.

As already discussed, the cooled flue gas can be fed directly into the burner 7 of the high-temperature combustion chamber 8, in order to vary the combustion chamber or flame temperature. It may also, however, be blown in next to the flame. The waste heat steam generator system 11 located in the flue gas line 10 can also be supplied with cooled flue gas from the flue gas recirculation line 19, specifically through the line 19z, in order to limit the temperature. In this case the cooled flue gas can be introduced directly into the flue gas line 10 and/or it can be blown in as a mist along the inner walls of the waste heat steam generator system 11, as indicated in the drawing by the two inlets near the wall. In this way, soiling of the waste heat steam generator system 11 is kept to a minimum. High-pressure water vapor is generated in the heating surfaces 20 in the waste heat steam generator system 11, and this water vapor can be used to feed the integrated steam power plant 21, or it can be used as process steam for internal and/or external consumers in a non-illustrated manner. The fresh air aspirated from the inlet 15e is heated in the fresh-air and flue-gas heat exchanger 17 built into the waste heat steam generator system 11.

Gas compressors 38, 16 and 39 respectively incorporated in the flue gas recirculation line 19, in the fresh-air line 15 and in the low-temperature carbonization gas line 6 are used to feed gas. The gas compressor 39 incorporated in the low-temperature carbonization gas line 6 furthermore serves to maintain a negative pressure, even if only slight one, in the pyrolysis drum 2. This negative pressure prevents low-temperature carbonization gases from escaping outside into the environment through the ring seals of the pyrolysis drum 2. Instead, and preferably, the gas compressor 39 may be disposed directly at the outlet of the system 13 in the form of a suction blower. This has the advantage of permitting the fine dust contained in the low-temperature carbonization gas at the fitting 4 to be fed practically completely and directly into the combustion chamber 8.

The solid pyrolysis residue removed from the pyrolysis drum 2 by means of the discharge device 3 is divided in the residue sorting device 22 into the fine component, the fine coarse component and the coarser coarse component. For this sorting, the residue sorting device 22 could also be equipped with a conveyor belt, onto which the pyrolysis residue drops. From this conveyor belt, the fine components could first be blown off with the "inert gas", and in the present case with the cooled flue gas compressed in the pressure-increasing compressor 24, and blown into the fine component line 25. Then, in a further portion of the conveyor belt, the coarse components having a lower specific gravity could be sorted out from the heavier coarse components, which remain on the conveyor belt, and be transported into the line 26. Through this line, these lighter components reach the grinding device 30. The coarse components having a high specific gravity would then drop from the end of the conveyor belt into the line 27, from where they would slide into the container 31.

The return of the fly ash removed from the dust filter system 12 and the waste heat steam generating system 11 to the high-temperature combustion chamber 8 by means of the ash return line 32 causes the fly ash to be melted there and bound in with the slag of the high-temperature combustion chamber 8. This slag is removed through the outlet 34 at the lower end of the high-temperature combustion chamber 8 and quenched in the container 34C, for example in the water bath of a wet slag remover. In the water bath, a relatively coarse-grained granulate is produced, which can be used for road construction and similar applications.

Three objectives are attained by sorting out the coarser coarse components of the pyrolysis residue, in particular all the metal parts, from the finer coarse components, in other words the combustible components, prior to the introduction thereof into the high-temperature combustion chamber 8. First, the sorted-out coarse components at this point in the plant are present in a hygienically safe state and are therefore maximally suitable for being temporarily stored for a relatively long period and for being shipped elsewhere. The non-oxidized state of the metals is particularly advantageous from the standpoint of further processing. Second, this prevents an excessive amount of metal oxides, in particular heavy metal oxides, from travelling into the flue gas through the high-temperature combustion chamber 8 and thus putting a particularly heavy burden on the flue gas scrubbing system 13. At the same time, rocks, pieces of ceramic and glass shards can be removed in the residue sorting device 22 and then dumped without difficulty. This has the further advantage of keeping the costs for the system 30 for comminuting the finer coarse components much lower than if the system had to be built to process all the waste from upstream of the pyrolysis reactor 2. Third, the preliminary sorting out of the coarse components has the advantage ensuring the slag occurring in the high-temperature combustion chamber 8, which is granulated in the wet slag remover 34 and occurs there in the glassified state, contains a relatively small amount of heavy metals. Since this small amount of heavy metals is furthermore enclosed in the slag in such a manner that they cannot leach out, the slag can be used in the construction materials industry, for example, without difficulty.

Only heavy metals, such as mercury and cadmium, which already evaporate at the pyrolysis temperature and are predominantly deposited on the pyrolysis coke, are evaporated and oxidized in the high-temperature combustion chamber 8 during the combustion of the fine dust. These heavy metal oxides, such as cadmium oxide and zinc oxide, occur primarily in the form of solid substances along with the fly ash in the systems 11 and 12, or to a certain extent are also precipitated out in the flue gas scrubbing system 13, an example being mercury oxide. Due to the return of fly ash through the line 32 to the high-temperature combustion chamber 8, these heavy metals recirculated until they are finally bound in the slag.

In this thermal waste disposal plant, the nitrogen oxide content of the flue gases can be kept at a low level. This is dictated by the admixture of cool flue gas directly into the burner 7 or besides the burner 7 into the high-temperature combustion chamber 8 (flue gas recirculation).

The above-described system for thermal waste disposal avoids the dependency on a single customer for the gas which is produced, as occurs with conventional in the known pyrolysis plants. It also converts the thermal energy of the waste into steam energy. The steam can be sent to a consumer, for instance, through a heat transmission line, and in the present case preferably to a steam power plant integrated with the thermal waste disposal plant, in order to generate electrical energy.

In FIG. 2, an embodiment is shown that has more technical details than the embodiment of FIG. 1. In this embodiment again, unshredded waste is fed into a feed device 1 with a metering sluice 36 that leads to a pyrolysis reactor 2. The waste is supplied with heating gas at reference numeral 2a and heating gas is removed at reference numeral 2b. On the discharge side, once again a discharge device 3 is attached, which has a low-temperature carbonization line 6 with low-temperature carbonization gas outlet and a fine dust outlet, and a pyrolysis residue outlet 5. The pyrolysis residue leaves this outlet for example at a temperature of 400° C. through a cooled discharge worm or screw 5A. From there, the pyrolysis residue drops into a residue sorting device 22, which has a sieve 22s and is constructed for sorting by piece size.

The coarser components having a diameter of more than 5 mm, for example, are discharged at the outlet on the left, while the finer components having a diameter of less than 5 mm are discharged at the outlet on the right. These components drop onto discharge worms or screws 22L and 22R. The coarse component obtained from the worm or screw 22L, which still contains combustible material, is delivered through a pathway 26a to a metal precipitator 44. This device separates the metal from the other substances and collects it in a container 31A. From there, it can be further processed in the form of scrap. The non-metallic coarse components (rocks, glass, ceramic and combustible components) are collected in a container 31B. From there, they travel through a transport pathway 26b to a further sorting device 46. This sorting device 46 may be an inclined chute, which is either jigged or onto which air is blown from below. The device 46 separates the entering substances in accordance with their specific gravity. This can, for example, also be done by means of wind sifting and/or through a jigging grate. The materials that are not combustible or are poorly combustible, such as rocks, glass and ceramic shards, are discharged through a line 27. On the other hand, the combustible coarse component is delivered through a line 26c to a grinding device 30. The fine coarse component (containing a superfine dust component, among other ingredients) is also sent to the grinding device 30 from the line 25. The supply of gas or air required for operation of the device 30 is shown at 30z. As in FIG. 1, the ground substance is delivered to the combustion chamber 8 or to the intermediate bin 29 through the outlet line 30a. If shredded waste is supplied, then the device 46 can be omitted.

The sorting and preparation device for the pyrolysis residue is shown in FIG. 2 in a box drawn in phantom and generally identified by reference numeral 48.

The foregoing is a description corresponding in substance to German Application P 38 11 820.3, dated Apr. 8, 1988, which is hereby made part of this application. Any material discrepancies between the foregoing specification and the aforementioned corresponding German application are to be resolved in favor of the latter. The International priority of German Applications P 37 25 704.8, dated Aug. 3, 1987 and P 38 11 820.3, dated Apr. 8, 1988, is being claimed for the instant application.

We claim:

1. Plant for thermal waste disposal, comprising a pyrolysis reactor converting waste into carbonization gas and substantially non-volatile pyrolysis residue, a discharge device connected to said pyrolysis reactor having a non-volatile pyrolysis residue outlet and a carbonization gas discharge fitting for removal of carbonization gas, a combustion chamber operated with an oxygen excess being connected to said carbonization gas discharge fitting for receiving the carbonization gas, a residue sorting device connected to said pyrolysis residue outlet of said discharge device for sorting out coarser coarse components substantially including non-combustible ingredients such as rocks, glass shards, broken porcelain, and metal parts, from combustible finer coarse components, a transport device connected to said residue sorting device for transporting the finer coarse components, a grinding apparatus having an inlet side connected to said transport device and a discharge side for feeding the finer coarse components to said combustion chamber after grinding, said combustion chamber having means for maintaining combustion gases produced from delivered combustible material for a sufficiently long time at a sufficient temperature level to produce molten slag, said combustion chamber having an outlet for removing the molten slag, means downstream of said outlet of said combustion chamber for cooling the molten slag into a glassified form, a flue gas line leading from said combustion chamber, and a chimney connected to said flue gas line.

2. Plant according to claim 1, including a waste heat steam generator system, a dust filtration system and a flue gas scrubbing system disposed in said flue gas line.

3. Plant according to claim 1, wherein said residue sorting device includes means for first separating the fine components and for next separating the finer coarse components from the coarser coarse components by blowing away with an inert gas.

4. Plant according to claim 1, wherein said combustion chamber includes means for withstanding wall temperatures above 1200° C. and for maintaining supplied gases at a temperature level above 1200° C.

5. Plant according to claim 1, including a line connected between said residue sorting device and said grinding apparatus for the fine components, and an intermediate bin connected between said grinding apparatus and said combustion chamber for the temporary storage of at least one of the fine components and the ground finer coarse components.

6. Plant according to claim 5, including a metering device connected between said intermediate bin and said combustion chamber for feeding intermediately stored components of the residue.

7. Plant according to claim 6, including a waste heat steam generator system, a dust filtration system and a fine gas scrubbing system disposed in said flue gas line, said metering device regulating the heating output of said waste heat steam generator system.

8. Plant according to claim 1, including a return line connected to said flue gas line and to said combustion chamber for returning fly ash precipitated out of flue to said combustion chamber.

9. Plant according to claim 2, wherein said flue gas line includes a point downstream of said waste heat steam generator system at which a first portion of flue gases is removed, and a flue gas recirculation line returning said first portion to said combustion chamber for temperature regulation.

10. Plant according to claim 9, including an inlet line through which a second portion of the flue gases is removed downstream of said waste heat steam generator system and returned to said waste heat steam generator system for temperature regulation.

11. Plant according to claim 10, wherein said inlet line carries said second portion of returned flue gases in a comparatively cold state and forms a comparatively cool gas mist along walls of said waste heat steam generator system when injected in said waste heat steam generator system.

12. Plant according to claim 4, wherein said combustion chamber is not connected to cooling means.

13. Plant according to claim 2, wherein said waste heat steam generator system produces steam for long-distance heat production.

14. Plant according to claim 2, wherein said waste heat steam generator system produces process steam.

15. Plant according to claim 2, including an integrated steam power plant connected to said waste heat steam generator system for receiving steam for power generation.

16. Plant according to claim 1, including a feed device introducing the waste in uncomminuted form into said pyrolysis reactor.

17. Plant according to claim 1, wherein said means for cooling the molten slag are in the form of a water bath for granulation of the slag removed from said combustion chamber.

18. Plant according to claim 12, wherein said combustion chamber includes heat insulation.

19. Plant according to claim 18, wherein said heat insulation is in the form of a masonry lining which is not connected to cooling means.

20. Plant according to claim 1, including a container, and a return line connected to said container through which fly ash precipitated out of flue gas and in particular enriched with metal oxide is removed into said container.

21. Plant for thermal waste disposal, comprising:
(a) a pyrolysis reactor converting waste into carbonization gas and pyrolysis residue at substantially 300° to 600° C.;
(b) a discharge device downstream of said pyrolysis reactor having a carbonization gas outlet and a pyrolysis residue outlet;
(c) a combustion chamber constructed for more than 1200° C. being connected to said carbonization gas outlet, means for heating said combustion chamber to a predetermined temperature level assuring thermal destruction of organic toxic substances introduced therein with the supplied gases, said combustion chamber having an outlet for the removal of molten slag, and means for cooling the molten slag into a glassified form; and
(d) a residue sorting device connected to said pyrolysis residue outlet for sorting the pyrolysis residue of said discharge device into components of larger and smaller diameters, and a grinding device connected between said residue sorting device and said combustion chamber for delivering the components of the residue having smaller diameters to said combustion chamber.

22. Method for thermal waste disposal, which comprises:
(a) carbonizing waste at a relatively low temperature while largely excluding oxygen, to form carbonization gas and a pyrolysis residue;
(b) sorting out the pyrolysis residue into a fine component, a finer coarse component and a coarser coarse component;
(c) combusting the fine component, comminuting and then combusting the finer coarse component, producing flue gas and molten slag, and precipitating out the coarser coarse component.

23. Method according to claim 22, which comprises combusting the finer coarse component together with the carbonization gas.

24. Method according to claim 22, which comprises precipitating dust out of the flue gas, and melting the dust into the slag.

25. Method according to claim 22, which comprises using thermal energy of the flue gas for at least one of heating supplied oxygen and generating steam.

26. Method according to claim 22, which comprises admixing scrubbed flue gas with burning carbonization gas for temperature regulation.

27. Method according to claim 22, which comprises temporarily storing at least one of the fine component and the finer coarse component prior to combustion.

28. Method according to claim 22, which comprises precipitating fly ash enriched with heavy metal oxides out of the flue gas and using the fly ash with heavy metal oxides as raw materials for recycling the heavy metal oxides.

29. Method according to claim 22, which comprises cooling the molten slag for later use for construction purposes.

* * * * *